United States Patent
Miller

[11] 3,966,446
[45] June 29, 1976

[54] AXIAL FABRICATION OF OPTICAL FIBERS

[75] Inventor: Stewart Edward Miller, Locust, N.J.

[73] Assignee: Bell Telephone Laboratories, Incorporated, Murray Hill, N.J.

[22] Filed: Oct. 23, 1975

[21] Appl. No.: 625,318

[52] U.S. Cl. .............................. 65/2; 65/3 A; 65/13; 65/18; 65/30 R; 65/DIG. 7
[51] Int. Cl.² ........................................ C03B 37/02
[58] Field of Search ............ 65/3 A, 4 B, 11 W, 18, 65/30 R, DIG. 7

[56] References Cited
UNITED STATES PATENTS

| | | | |
|---|---|---|---|
| 3,642,521 | 2/1972 | Moltzan | 65/30 R X |
| 3,737,292 | 6/1973 | Keck et al. | 65/3 A |
| 3,823,995 | 7/1974 | Carpenter | 65/3 A X |
| 3,826,560 | 7/1974 | Schultz | 65/3 A X |
| 3,859,073 | 1/1975 | Schultz | 65/3 A X |
| 3,868,170 | 2/1975 | DeLuca | 65/3 A X |

Primary Examiner—Robert L. Lindsay, Jr.
Attorney, Agent, or Firm—P. V. D. Wilde

[57] ABSTRACT

An improved technique for producing optical fibers is disclosed. In this technique the optical fiber preform is fabricated by axial deposition from a direction along the preform axis as opposed to radial deposition from a direction perpendicular to the preform axis. The instant technique does not require a cylindrical mandrel and, consequently, the technique does not require removal of a mandrel and the collapse of a non-solid preform prior to drawing. In addition to these advantages, the technique may be used to form optical fibers with highly resolved longitudinal gradations in index of refraction. The resolution of such gradations when formed using the instant technique is limited only by the deposition rate and the ability to rapidly alter the concentration of the material being deposited.

6 Claims, 4 Drawing Figures

AXIAL FABRICATION OF OPTICAL FIBERS

BACKGROUND OF THE INVENTION

1. Field of the Invention

This invention is an improved technique for producing optical fibers. The technique eliminates a number of steps heretofore required in the manufacture of preforms from which the fibers are to be drawn. In addition, the technique allows for the formation of fibers with highly resolved longitudinal gradations in index of refraction. Such gradations are known to enhance mode conversion, thereby reducing mode dispersion.

2. Description of the Prior Art

The many advantages of optical communications, both potential and realized, have stimulated significant efforts directed towards further development of this field of technology. The advantages of optical communications have long been apparent from basic theoretical considerations. However, it was not until the discovery of the laser that the development of this technology began in earnest. This may be attributed to the improved efficiency of optical communications when combined with coherent light sources.

Although the realization of a totally optical communication system still seems far in the future, the advantages of optical transmission alone are sufficiently impressive to warrant considerable effort in the development of optical transmission systems. For example, the high frequency associated with visible radiation allows for a significant increase in bandwidth over that available in normal electrical transmission systems. However, to transmit light and utilize this increased bandwidth, a medium capable of supporting optical signals must be developed. Basic electromagnetic theory indicates that light traversing a medium of index of refraction $n_1$ will not be transmitted through an interface with a medium of index of refraction $n_2$, if $n_1$ is greater than $n_2$, and if the angle that the light ray makes with the interface is less than arc cosine $n_1/n_2$. Under such circumstances the light is contained in the medium $n_1$ and will be transmitted through this medium. This basic principle has led to the development of glass fibers for use as optical transmission lines. In this development a significant hurdle to be overcome has been the development of fibers whose optical loss is low enough for practical applications. Losses smaller than 50 db/km are necessary for short length transmission, while losses of a few db per km or less are necessary for long distance transmission.

At the present time glass deposition fiber fabrication techniques are found to be the most economically feasible while at the same time yielding the requisite low loss qualities. Two different deposition processes are now being considered for widespread use—the "soot" deposition technique, and the modified chemical vapor deposition technique. In the soot deposition technique a gas vapor mixture is hydrolyzed within a flame to form a glass precursor particulate, or soot. The gas vapor is produced, for example, by bubbling oxygen through chlorides, hydrides or other compounds of silica, or any desired dopant such as germanium. The glass soot, formed by the hydrolysis of the vapor in the burner, is deposited on a rotating glass rod which serves as a mandrel. The soot is deposited from a direction perpendicular to the mandrel and the burner is translated parallel to the mandrel axis during the deposition. In this manner successive layers of constant radius are formed. A preform with radial gradations in index of refraction, for improved transmission characteristics, may be produced in like manner by changing the dopant concentration on each successive pass of the burner. When a sufficient amount of soot has been deposited the preform is heated in an oven in order to consolidate the soot into a unitary glass body. The rod mandrel is then removed and the cylindrical preform is collapsed to a solid rod and drawn into an optical fiber using flame, oven, or laser techniques well known in the art. This process for producing optical preforms is discussed in detail in U.S. Pat. Nos. 3,826,560 and 3,823,195.

In certain applications it is desirable to use optical fibers with longitudinal gradations in index of refraction. As will be discussed later such fibers display improved "mode conversion" transmission characteristics. In the "soot" technique, as it is commonly practiced, the longitudinal resolution of any material gradations is limited by the breadth of the flame and the particulate stream. The breadth of the flame is of the order of centimeters and this technique is, consequently, not capable of forming the micron gradations necessary in longitudinally graded fiber preforms.

The second prevalent technique for producing optical fibers is the modified chemical vapor deposition technique (MCVD). This technique is described in a commonly assigned application Ser. No. 444,705. In this technique a gas vapor mixture is directed through a glass tube. The gas vapor includes the normal glass precursor vapors as described above. A ring of heaters surrounds the outside of the tube and traverses it from one end to the other while the tube is rotated in a glass lathe. As the vapor passes that section of the cylinder which is being heated, the vapor forms particulate matter which drifts downstream, settles on the tube's inner wall, and is subsequently fused onto the inner surface of the glass tube, thereby forming a unitary glass structure. The burner traverses the rod at a predetermined rate and makes numerous successive passes depending on the amount of deposition required. After a sufficient deposit has built up the tube is collapsed to a solid preform and subsequently drawn into a fiber.

In the MCVD process gradations in index of refraction can be produced by varying the dopant concentration in the gas mixture flowing down the center of the cylinder. In such a manner, for example, radial gradations in index of refraction may be produced by changing the dopant concentration for each successive pass of the burner ring. It is clear, however, that in this technique any attempt at producing longitudinal gradations in index of refraction is limited by the diffusion characteristics of the particulate matter that is formed within the cylinder. This restriction places an upper limit on the amount of longitudinal resolution, that is, the size of the gradation, which may be produced.

Since a specific embodiment of the instant invention involves the fabrication of longitudinally graded fibers, an understanding of the role of such fibers in optical transmission will aid in the appreciation of the invention. The need for fibers with gradations in index of refraction especially arises when, in order to more effectively carry information, the envisioned optical signal is in the form of optical pulses. Such pulses must be individually resolvable at the detecting end of the transmission line, as they were at the launching end. A number of phenomena, however, tend to broaden the pulses and consequently degrade the resolution. One of these phenomena is the frequency dispersion effect. As a result of this effect, light of different frequencies travels at different speeds within the fiber. Consequently the different frequency components in an optical pulse of light travel at different velocities — arriving at the detector at different times, thereby broadening the pulse. The use of highly monochromatic light, for example from a laser, helps to alleviate the frequency dispersion problem.

However, in addition to frequency dispersion, there is a serious mode dispersion effect. This effect may be understood by considering the different paths that a given light ray may take as it traverses the optical fiber. It may, for example, proceed directly down the center of the fiber. On the other hand, it may reflect off the fiber walls numerous times as it traverses the fiber. Each of these possible paths, referred to as modes, has a different path length and consequently the traversal time associated with each of these modes is different. Different pulses will traverse the fiber in different times depending upon the mode in which they are transmitted. In addition, different components of a given pulse will traverse the fiber in different modes and hence in different times. These effects result in a general broadening of the pulses, and a consequent loss of pulse resolution and hence bandwidth. Such effects are referred to by the term mode dispersion.

Initial attempts to alleviate the mode dispersion problem involved the fabrication of single mode fibers. Such fibers will support only one specific mode, thereby eliminating mode dispersion. Technical difficulties were, however, encountered with single mode fibers. Launching an optical signal into a small diameter signal mode fiber entails severe restraints on the coupling system between the source and the fiber. In addition, single mode fibers cannot efficiently transmit light produced by incoherent sources such as the common light-emitting diodes. Since such light sources are simpler and more economical than lasers, considerable interest has centered about multimode waveguides which can efficiently transmit such light. However since such a fiber can support many different modes the mode dispersion effect is an important consideration, and advantageously is minimized in order to maximize the information carrying capacity of the fiber.

The earliest reductions in mode dispersion in multimode fibers were effected by means of radial gradations in the index of refraction of the fibers. Under such conditions the velocity of light may be greater near the surface of the fiber than at the center. Hence the longer path length modes, which are concentrated at the fiber surface, have greater velocities than the shorter path length modes which are concentrated at the fiber core. Under such conditions the difference in velocity from mode to mode compensates for the different path lengths in the various modes and results in a single traversal time applicable to all of the modes. Fabrication of fibers designed to yield this effect are discussed in U.S. Pat. Nos. 3,823,995 and 3,826,560.

In an article by S. D. Personic in the Bell System Technical Journal, Volume 50, No. 3, March 1971, page 843, an alternative technique for alleviating mode dispersion effects is suggested. Personic shows that while the pulse broadening associated with mode dispersion increases proportionately with the length of the fiber, efficient intentional mode conversion results in a broadening effect which is proportional only to the square root of the fiber length. Stimulated by this finding, numerous studies were made to determine the most effective techniques for enhancing mode conversion. One particular method involves the introduction of gradations in the index of refraction of the fiber along the longitudinal direction. It has been found, however, that to maximize the mode conversion while maintaining radiation loss mechanisms within tolerable limits the spatial periods of such gradations must be between 1 and 10 millimeters. To achieve such spatial gradations while using otherwise conventional fiber drawing techniques, the preform from which the fiber is pulled must have spatial gradations of the order of microns. No practical fabrication techniques have been available to produce gradations of such high resolution. The instant application may be utilized in the fabrication of optical fibers with such highly resolved longitudinal gradations in index of refraction.

SUMMARY OF THE INVENTION

This invention is an improved method of producing optical fibers which may be applied to the prevalent deposition processes. In the practice of this invention the fiber preform is fabricated axially by deposition from a direction along the axis of the cylindrical preform. This is as opposed to prior techniques in which the fiber preform is fabricated radially by deposition from a direction perpendicular to the preform axis. Advantages which may enure to the processor through the practice of this invention include the absence of any cylindrical mandrel in the formation of the preform from which the fiber is to be drawn. Consequently, no such mandrel need be removed before the fiber drawing step. In addition, the deposition may result in a solid preform and consequently the preform need not be collapsed to a solid body prior to drawing. Such collapse is required in the present practice of the soot deposition and the MCVD processes. A preferred embodiment of the present technique includes the fabrication of optical fibers which will have highly resolved and, if required, may have sharply defined longitudinal gradations in index of refraction. Such fibers will then operate as efficient mode converters and will more effectively transmit optical signals.

DETAILED DESCRIPTION

Figure 1:
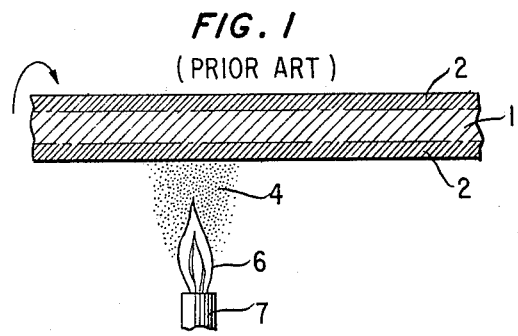
FIG. 1 is a representation of the prior art deposition process.

In FIG. 1 the deposition geometry associated with the prior art technique is depicted. Here, particulate matter, 4, is deposited on a rotating cylindrical starting mandrel 1. The particulate matter or soot is formed in the flame 6 of a hydrolysis burner 7. After a predetermined number of passes a layer of soot material 2 is built up on the starting member. This material is then consolidated by heating, the starting member is removed, the resultant preform is collapsed to a solid body, and the fiber is then drawn.

Figure 2:
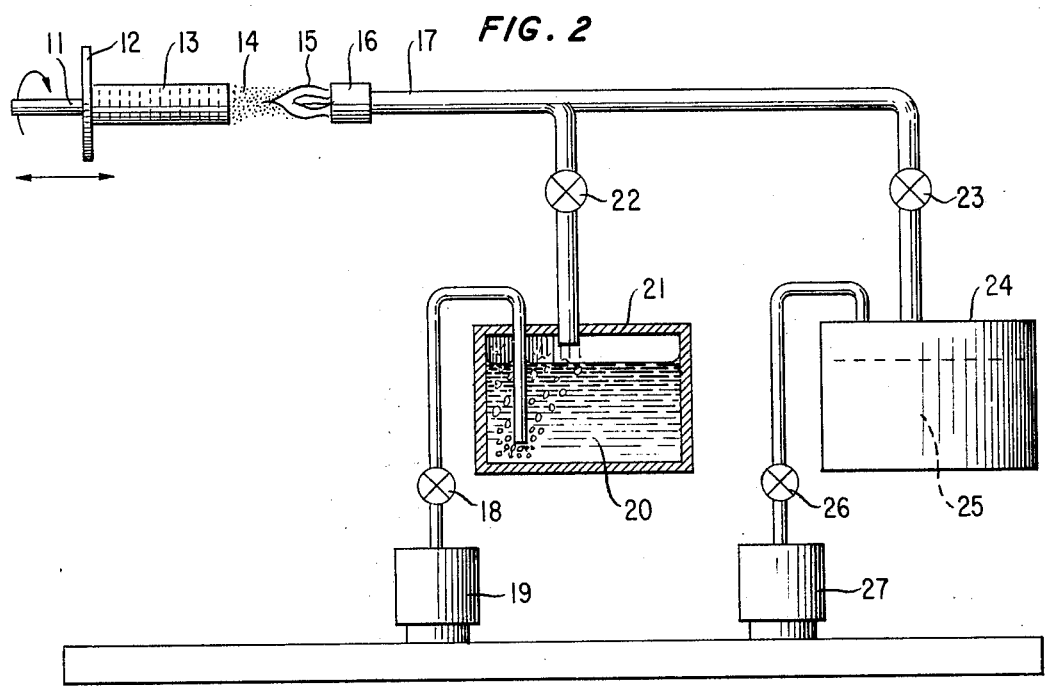
FIG. 2 is a schematic representation of the formation of an optical fiber preform according to the teachings of this invention.

A specific embodiment of the instant invention is shown in FIG. 2. In this Figure the fabrication of an optical fiber preform, 13, is depicted. Here 12 is a flat starting member preferably rotated by means of a rod 11 about an axis perpendicular to the flat face of the starting member. A hydrolysis burner 16 burns glass precursor vapors in a flame 15, to produce a glass soot 14, which is deposited in the starting member. An essential element of the instant invention is shown in that the soot 14 is being deposited axially rather than radially. This may be accomplished by depositing the material from a direction along the preform axis as shown in FIG. 2, rather than from a direction perpendicular to it as shown in FIG. 1. Unlike the prior art technique, shown in FIG. 1, the instant technque does not require removal of a mandrel and collapse of the remaining preform, before fiber can be drawn.

The composition of the soot may be varied in time to yield a preform with material gradations and hence index of refraction gradations, along the preform axis, as shown. A 6 centimeter soot rod, fabricated according to this technique, was completed in about 3 hours during a test of this process. The deposition rate of about 5 microns per second, when combined with time variation in the composition of the deposited matter, allows for the fabrication of highly resolved longitudinal gradations. This is to be compared with the prior art configuration shown in FIG. 1. There, any attempt to fabricate longitudinal gradations is limited by the physical extent of the soot pattern. The pattern is of the order of centimeters and hence is approximately four orders of magnitude too large for the required micron gradations.

The soot production mechanism is well known in the art and is discussed in the previously mentioned United States patents. Compound 20, of silicon, germanium or other glass precurser elements is placed in a vessel 21. A carrier gas such as $O_2$, supplied in a vessel 19, is bubbled through the compound 20. The bubbling rate is controlled by the valve 18 or 22. A typical compound used in an embodiment of this invention may be $SiCl_4$. The $O_2$ carried $SiCl_4$ is supplied to the burner through the valve 22 and tubing 17. Other flame supporting gases not shown in FIG. 2 are also supplied to the burner. The hydrolysis, which occurs in the flame and its environs, results in the transformation of the $SiCl_4$ to $SiO_2$ soot which is then deposited as shown in FIG. 2. The burner jet assembly may be designed to control the width of the soot stream as well as to increase its uniformity. A more uniform stream of particles will result in a more nearly constant diameter preform. Significant variations in the preform diameter may be removed during consolidation, while smaller diameter variations may be compensated for during fiber drawing by varying the temperature of the preform at its drawing point.

The ability to form highly resolved longitudinal gradations in the preform, as shown in FIG. 2, is a particular advantage of the instant technique. While the technique is not limited to the soot deposition process, its practice to fabricate longitudinally graded preforms is presented in terms of this process. In order to vary the composition of the soot, 14, an additional vessel 24 is supplied which contains a dopant precursor compound, 25, such as $GeCl_4$, $TiCl_3$, $BCl_3$, or any other appropriate dopant. A carrier gas supplied in the vessel 27 is released through a valve 26 and bubbled through the compound. The dopant is thereby supplied to the burner 16 by means of a time varying valve either at 23 or 26.

The width of the preform gradations is determined by the periodicity of the valve action at 23 or 26 and the deposition rate at 14. Sharp cutoffs by the valve at 23 or 26 will result in highly defined gradations in the preform. However, theory has shown that radiative losses in the ultimate fiber are minimized when the gradations are continuous and gradually blend one into another. This preferred geometry may be accomplished by gradually varying the dopant flow at 23, again synchronizing it with the flow rate at 22 and the deposition rate at 14. The relative flow rates at 22 and 23 are adjusted depending on the dopant and the desired variation in index of refraction.

The apparatus is provided with a means, indicated schematically at rod 11, for producing relative motion between the burner 16 and the preform 13 so that the distance between these two may be maintained constant even as the preform increases in length during the deposition.

Figure 3:
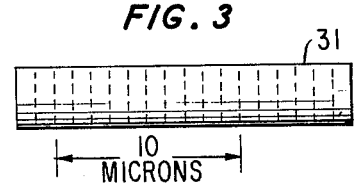
FIG. 3 is a representation of a longitudinally graded fiber preform fabricated according to the teachings of this invention.
Figure 4:
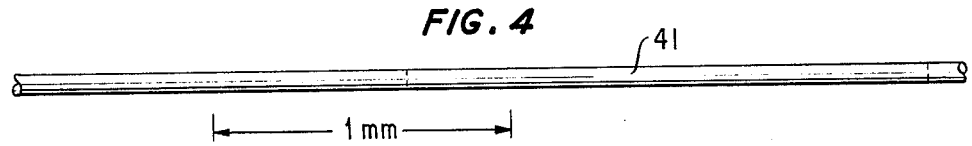
FIG. 4 is a representation of a fiber drawn from the preform shown in FIG. 3.

After the preform is grown to a sufficient length, it is consolidated by heating, to yield the structure 31, shown in FIG. 3. This structure is then drawn into an optical fiber 41, shown in FIG. 4. The drawing process may utilize a laser for heating as described in the commonly assigned U.S. Pat. No. 3,865,584. A fiber as shown in FIG. 4, will transmit light in multitude of modes thereby minimizing the mode dispersion effect as discussed above.

EXAMPLE

In a proposed specific embodiment of this invention the starting member is a plate of fused quartz attached to a rod by which it is rotated at 40 revolutions per minute. Glass soot is deposited on the quartz plate using a hydrolysis burner which is maintained at a distance of 16 centimeters from the preform as the preform develops.

The hydrolysis burner consists of a concentric pattern of jets. Through the center jet is emitted a mixture of oxygen and glass precursor vapor. The center jet is surrounded by a series of inner shield jets which emit oxygen and prevent the buildup of glass on the burner. The inner shield is surrounded by a series of burner jets which emit an appropriate flammable gas. The burner jets are surrounded by outer jets which emit oxygen, and are used to direct the flame and the particle stream. In this example the oxygen flow rate to the outer jets is 7 liters per minute. Flowing from the burner jets is methane at the rate of 8 liters per minute combined with oxygen flowing at the rate of 6 liters per minute. Flowing from the inner shield is oxygen at the rate of 5 liters per minute. The center jets emit silicon tetrachloride ($SiCl_4$) and a mixture of silicon tetrachloride and germanium tetrachloride ($GeCl_4$) successively, both borne by a flow of oxygen. The oxygen flow rate for the silicon tetrachloride is 0.15 liters per minute while the flow rate for the mixture is 0.2 liters per minute. Successive 5 micron layers of silicon oxide and germanium silicon oxide are fabricated by changing the composition of the flow from the center jet approximately every 10 seconds. In this manner a preform of glass soot 6 millimeters long with 5 micron longitudinal gradations in material composition is fabricated in 3 hours. The diameter of the preform is determined by the flame breadth and in an exemplary embodiment is 10 millimeters.

The soot structure is suspended in an oven by means of the rod attached to the flat starting member and heated in a He atmosphere to a temperature of 1450°C for one hour. This consolidates the soot into a glass and results in a 3 millimeter preform with a 5 millimeter outside diameter and 2.5 micron longitudinal gradations in index of refraction. The preform is then set in a pulling apparatus by means of the aforementioned rod, 11, and is pulled into a fiber. The pulling apparatus includes a furnace heated to 2000°C. The preform is fed into the furnace at a rate of 0.4 millimeters per second and the fiber is pulled at a rate of 1 meter per second yielding a fiber 100 microns in diameter with 6.25 millimeter longitudinal gradations in index of refraction.

The above example is illustrative only and the parameters and techniques mentioned in it may be varied within the scope and spirit of the invention.

I claim:

1. A method of forming an optical fiber, comprising:
    forming thermochemically a particulate glass precursor material capable of being consolidated into a glass of optical loss less than 50 db/km;
    rotating a base member about an axis substantially perpendicular to its flat surface;
    directing axially a stream of the said particulate matter onto the rotating flat base member from a direction substantially perpendicular to the surface of the base member; and
    drawing the structure into an optical fiber.

2. The method of claim 1 wherein the composition of the particulate material is varied during the deposition to yield a spatially periodic longitudinally graded optical fiber.

3. The method of claim 2 wherein the gradations in the optical fiber are between 1mm and 10mm in longitudinal extent.

4. The method of claim 1 where the particulate material is $SiO_2$.

5. The method of claim 2 wherein the particulate material is $SiO_2$, and is doped with Ge to yield the said longitudinal gradation.

6. The method of claim 1 wherein the particulate material is formed by means of a hydrolysis burner.

* * * * *

UNITED STATES PATENT AND TRADEMARK OFFICE
CERTIFICATE OF CORRECTION

PATENT NO. : 3,966,446
DATED : June 29, 1976
INVENTOR(S) : Stewart E. Miller

It is certified that error appears in the above-identified patent and that said Letters Patent are hereby corrected as shown below:

On the Abstract page, the figure should indicate --(Prior Art)--.

Column 3, line 34, "signal", second occurrence, should read --single--.

Signed and Sealed this

Ninth Day of November 1976

[SEAL]

Attest:

RUTH C. MASON
Attesting Officer

C. MARSHALL DANN
Commissioner of Patents and Trademarks